US006677400B2

(12) United States Patent
Münzmay et al.

(10) Patent No.: US 6,677,400 B2
(45) Date of Patent: Jan. 13, 2004

(54) AQUEOUS DISPERSIONS OF HYDROPHILIC POLYURETHANE RESINS

(75) Inventors: Thomas Münzmay, Dormagen (DE); Uwe Klippert, Burscheid (DE); Frank Kobor, Beijjing (CN); Claus Kobusch, Shanghai (CN); Gerald Kurek, Leverkusen (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 10/212,444

(22) Filed: Aug. 5, 2002

(65) Prior Publication Data

US 2003/0049457 A1 Mar. 13, 2003

(30) Foreign Application Priority Data

Aug. 7, 2001 (DE) .......................... 101 38 765

(51) Int. Cl.⁷ ............................. C08G 18/48
(52) U.S. Cl. .................. 524/839; 524/840; 528/49; 528/79; 528/61; 523/336; 523/339; 428/423.5; 428/423.7; 428/424.2
(58) Field of Search ................. 524/839, 840; 528/49, 79, 61; 523/336, 339; 428/423.7, 423.5, 424.2

(56) References Cited

U.S. PATENT DOCUMENTS

| 3,905,929 A | 9/1975 | Noll | 260/29.2 TN |
|---|---|---|---|
| 3,920,598 A | 11/1975 | Reiff et al. | 260/29.2 TN |
| 4,237,264 A | 12/1980 | Noll et al. | 528/67 |
| 5,548,016 A | 8/1996 | Provenzola | 524/507 |

*Primary Examiner*—Rachel Gorr
(74) *Attorney, Agent, or Firm*—Joseph C. Gil; Thomas W. Roy

(57) ABSTRACT

An aqueous polyurethane resin dispersions containing i) a polyol component with a molecular weight above 300 daltons, containing a polyether diol initiated on an aromatic diol, ii) a polyol component with a molecular weight of 62 to 299 daltons, iii) a monofunctional isocyanate-reactive compound with an ethylene oxide content of at least 50 wt. % and a molecular weight of at least 400 daltons, iv) a polyisocyanate v) an aliphatic polyamine with a molecular weight of 60 to 300 daltons or hydrazine, and vi) a hydrophilic aliphatic diamine, a process for making the dispersion and substrates primed with the dispersion.

12 Claims, No Drawings

AQUEOUS DISPERSIONS OF HYDROPHILIC POLYURETHANE RESINS

FIELD OF THE INVENTION

The present invention relates to polyurethane dispersions, a process for their production and solvent-free primers for substrates containing these dispersions. The invention also relates to substrates, in particular plastics, primed with the dispersions, which have improved adhesion and higher gloss.

BACKGROUND OF THE INVENTION

Paint on high-grade plastic parts is applied in three layers. Such a layered structure comprises a primer, base coat and clear coat. The primer acts as the bonding agent between substrate and paint. An important property of a primer should therefore be to ensure good bonding on different plastic substrates. Aqueous primers can sometimes not adequately fulfil this basic requirement.

A further property of the primer is the possibility of covering and/or levelling defects in the surface of the molding. Since this cannot be entirely successful for all defects, these defects are conventionally eliminated after the priming step by regrinding. Good grinding ability on the part of the primer is therefore essential. Surface defects that are not eliminated at this point in the manufacturing process must be reworked at a later stage of the production process, involving considerably greater effort and higher costs. Otherwise the molding would be unable to be used. The discovery of even the smallest surface defect is therefore of enormous significance. Since defects and irregularities are easier to detect on glossy surfaces, a good primer should display a minimum gloss.

The requirements of a primer as described above are already met by solvent based (organically dissolved) polyurethanes of the prior art. However, these organically dissolved primers contribute to a considerable extent to the overall solvent emissions of a painting line. The use of organically dissolved primers in modern painting lines is therefore not desirable in ecological and economic terms. The lowest possible contribution to the volatile organic content (VOC) is a further requirement of a suitable primer. There is thus an urgent need for solvent-free aqueous primers for plastic parts that satisfy the requirements described above.

As yet, however, no systems based on purely aqueous polyurethane dispersions are known that satisfactorily solve all of the aspects of a primer as described above.

U.S. Pat. No. 5,548,016 describes coatings containing mixtures of aqueous preparations of polyurethanes and polyacrylates. These are suitable as a primer for the painting of plastic parts if 10 to 25 wt. % of an organic, water-miscible solvent (co-solvent) are added.

DE-A 2 651 506 describes a process for the production of polyurethanes that are dispersible in water. The process products disclosed therein are not suitable as a primer in the painting process for plastic parts, however, as they do not have the necessary adhesive properties.

It is an object of the present invention to provide a solvent-free, aqueous primer for substrate surfaces, in particular plastics, that meet the requirements described above.

It has now been found that coating compositions based on the polyurethane dispersions according to the invention are outstandingly suitable as a primer for the painting of diverse substrate surfaces, preferably plastic substrates.

SUMMARY OF THE INVENTION

The present invention relates to an aqueous polyurethane resin dispersion containing i) a polyol component with a number-average molecular weight of at least 300 daltons, containing at least one polyether diol initiated on an aromatic diol, ii) a polyol component with a number-average molecular weight of 62 to 299 daltons, iii) a monofunctional isocyanate-reactive compound with an ethylene oxide content of at least 50 wt. % and a molecular weight of at least 400 daltons, iv) a polyisocyanate, v) an aliphatic polyamine with a molecular weight of 60 to 300 daltons or hydrazine, and vi) a hydrophilic aliphatic diamine.

The invention also relates to a coating composition containing

A) 30 to 90 parts by weight of this polyurethane resin dispersion,

B) 5 to 60 parts by weight of an inorganic filler,

C) 1 to 60 parts by weight of a water-miscible polyisocyanate,

D) 0.1 to 30 parts by weight of a pigment, and

E) 1 to 15 parts by weight of a paint additive, whereby the sum of the components is 100 parts by weight.

The invention also relates to a process for production of the dispersions and a substrate primed with the dispersion.

DETAILED DESCRIPTION OF THE INVENTION

The coating compositions containing the polyurethane resin dispersions according to the invention show outstanding adhesion both to diverse substrate surfaces, in particular plastic substrates, and to subsequent paint films, improved resistance to condensation and solvents in the overall paint structure and an extremely low VOC.

In the context of the invention the term "polyurethane" also includes "polyurethane polyureas", i.e., high-molecular compounds containing urea groups in addition to urethane groups.

Suitable structural components i) include organic compounds containing at least two free hydroxyl groups, which are capable of reacting with isocyanate groups. Examples of such organic compounds include higher-molecular compounds from the classes of polyester, polyester amide, polycarbonate, polyacetal and polyether polyols with a number average molecular weight of at least 300, preferably 500 to 8000, particularly preferably 800 to 5000 daltons. Preferred compounds are, for example, those containing two hydroxyl groups (difunctionally), such as polyester diols or polycarbonate diols.

Examples of polyester polyols include linear polyester diols or weakly branched polyester polyols, prepared from aliphatic, cycloaliphatic or aromatic dicarboxylic or polycarboxylic acids or anhydrides thereof, such as succinic, glutaric, adipic, pimelic, suberic, azelaic, sebacic, nonane dicarboxylic, decane dicarboxylic, terephthalic, isophthalic, o-phthalic, tetrahydrophthalic, hexahydrophthalic or trimellitic acid, and acid anhydrides, such as o-phthalic, trimellitic or succinic anhydride or a mixture thereof with polyhydric alcohols, such as, e.g., ethanediol, diethylene, triethylene, tetraethylene glycol, 1,2-propanediol, dipropylene, tripropylene, tetrapropylene glycol, 1,3-propanediol, butane-1,4-diol, butane-1,3-diol, butane-2,3-diol, pentane-1, 5-diol, hexane-1,6-diol, 2,2-dimethyl-1,3-propanediol, 1,4-dihydroxycyclohexane, 1,4-dimethylol cyclohexane, octane-1,8-diol, decane-1,10-diol, dodecane-1,12-diol or mixtures thereof, optionally with the additional use of higher-functional polyols, such as trimethylol propane or glycerol. Examples of polyhydric alcohols for production of the polyester polyols also include cycloaliphatic and/or aromatic dihydroxyl and polyhydroxyl compounds. Instead of the free polycarboxylic acid the corresponding polycarboxylic anhydrides or corresponding polycarboxylic acid esters of low alcohols or mixtures thereof can also be used to produce the polyesters.

The polyester polyols can also be homopolymers or copolymers of lactones, which are preferably obtained by reacting lactones or lactone mixtures, such as butyrolactone, ε-caprolactone and/or methyl ε-caprolactone with suitable difunctional and/or higher functional initiator molecules, such as the low-molecular, polyhydric alcohols mentioned above.

Polycarbonates having hydroxyl groups are also suitable as polyhydroxyl components, and include those that can be produced by reacting diols such as 1,4-butanediol and/or 1,6-hexanediol with diaryl carbonates, e.g., diphenyl carbonate, dialkyl carbonate, such as dimethyl carbonate or phosgene, with a number-average molecular weight of 800 to 5000 daltons.

Preferred structural components i) are polyester diols based on adipic acid and glycols such as 1,4-butanediol, 1,6-hexanediol and/or 2,2-dimethyl-1,3-propanediol (neopentyl glycol). Likewise preferred are copolymers of 1,6-hexanediol with ε-caprolactane and diphenyl carbonate with a number-average molecular weight of 1000 to 4000 daltons, and 1,6-hexanediol polycarbonate diols with a number-average molecular weight of 1000 to 3000 daltons.

Examples of polyether polyols include the polyaddition products of styrene oxides, of ethylene oxide, propylene oxide, tetrahydrofuran, butylene oxide, epichlorohydrin, and their co-addition and graft products, as well as the polyether polyols obtained by condensation of polyhydric alcohols or mixtures thereof and by alkoxylation of polyhydric alcohols, amines and aminoalcohols.

The structural component i) contains polyether diols initiated on aromatic diols, which are produced, for example, by polyaddition of alkylene oxides, such as propylene oxide, ethylene oxide, butylene oxide or styrene oxide to aromatic diols. Preferred alkylene oxides are propylene oxide and ethylene oxide, propylene oxide is particularly preferred. Examples of suitable aromatic diols include hydroquinone, resorcinol, catechol or 2,2-bis(4-hydroxyphenyl)propane (bisphenol A). Aromatic polycarboxylic acids, such as, e.g., o-, iso- or terephthalic acid can also be used as initiators for the alkoxylation reaction. 2,2-bis(4-hydroxyphenyl)propane is preferred.

Preferred polyether polyols initiated on aromatic diols are the propoxylation products of 2,2-bis(4-hydroxyphenyl) propane (bisphenol A) in the molecular weight range between 300 and 3000 dalton, particularly preferably between 500 and 1250 dalton. The amount of polyether diols initiated on aromatic diols in the structural component i) in the polyurethane dispersions according to the invention is between 3 and 100 parts by weight, preferably between 5 and 50 parts by weight, particularly preferably between 5.5 and 30 parts by weight.

Suitable structural components ii) include diols in the molecular weight range 62 to 299. They include, for example, the polyhydric, in particular, dihydric, alcohols mentioned for the production of the polyester polyols, as well as low-molecular polyester diols, such as, e.g., adipic acid bis(hydroxyethyl)ester. Preferred structural components ii) are 1,2-ethanediol, 1,4-butanediol, 1,6-hexanediol and 2,2-dimethyl propane-1,3-diol. 1,4-butanediol and 1,6-hexanediol are more preferred.

The polyurethane resin dispersions according to the invention display, relative to solids, a content of 1 to 4 wt. % of terminally and/or laterally incorporated ethylene oxide units, which can easily be incorporated by the inclusion of structural components iii) in the isocyanate polyaddition process.

Hydrophilic structural components iii) for the incorporation of terminal chains having hydrophilic ethylene oxide units include compounds having formula (I),

H-Y'-X-Y-R    (I)

in which
 R represents a monovalent hydrocarbon radical with 1 to 12 carbon atoms, preferably an unsubstituted alkyl radical with 1 to 4 carbon atoms,
 X represents a polyalkylene oxide chain with 5 to 90, preferably 20 to 70, chain segments, which consist of at least 40%, preferably at least 65% ethylene oxide units and which in addition to ethylene oxide units can contain of propylene oxide, butylene oxide or styrene oxide units, whereby of the last-named units propylene oxide units are preferred, and
 Y and Y' preferably independently represent oxygen or —NR'—, where R' represents R or hydrogen.

Monofunctional polyethers are preferably only used in molar quantities of ≦10%, relative to the polyisocyanate used to ensure the desired high-molecular structure of the polyurethane elastomers. If larger molar quantities of monofunctional alkylene oxide polyethers are used, the additional use of trifunctional compounds displaying isocyanate-reactive hydrogen atoms is advantageous, with the proviso, however, that the average functionality of the starting compounds is not greater than 2.1. The monofunctional hydrophilic structural components can be produced by analogy to those in DE-OS 2 314 512 or 2 314 513 or in U.S. Pat. Nos. 3,905,929 or 3,920,598 by alkoxylation of a monofunctional initiator such as, e.g., n-butanol or N-methyl butylamine using ethylene oxide and optionally an additional alkylene oxide such as, e.g., propylene oxide.

Copolymers of ethylene oxide with propylene oxide having more than 50% by weight of ethylene oxide are preferred, a content of 55 to 89% by weight is more preferred.

In a preferred embodiment, structural components iii) have a number-average molecular weight of at least 400 daltons, more preferred of at least 500 daltons and most preferred from 1200 to 4500 daltons.

Suitable structural components iv) include any organic compound having at least two free isocyanate groups per molecule. Examples include the diisocyanates $X(NCO)_2$, whereby X represents a divalent aliphatic hydrocarbon radical with 4 to 12 carbon atoms, a divalent cycloaliphatic hydrocarbon radical with 6 to 15 carbon atoms, a divalent aromatic hydrocarbon radical with 6 to 15 carbon atoms or a divalent aralphatic hydrocarbon radical with 7 to 15 carbon atoms. Other examples of compounds that can be used as diisocyanate components are described, e.g., by W. Siefken in Justus Liebigs Annalen der Chemie, 562, p. 75-136.

Examples of diisocyanates that are preferably to be used are tetramethylene diisocyanate, methyl pentamethylene diisocyanate, hexamethylene diisocyanate, dodecamethylene diisocyanate, 1,4-diisocyanatocyclohexane, 1-isocyanato-3,3,5-trimethyl-5-isocyanatomethyl cyclohexane, 4,4'-diisocyanatodicyclohexyl methane, 4,4'-diisocyanatodicyclohexyl propane-(2,2), 1,4-diisocyanatobenzene, 2,4-diisocyanatotoluene, 2,6-diisocyanatotoluene, 4,4'-diisocyanatodiphenyl methane, 2,2'- and 2,4'-diisocyanatodiphenyl methane, p-xylylene diisocyanate, 1,3- and 1,4-diisocyanatomethyl benzene, and mixtures consisting of these compounds. 1-isocyanato-3,3, 5-trimethyl-5-isocyanatomethyl cyclohexane and 4,4'-diisocyanatodicyclohexyl methane are particularly preferred.

It is also possible to incorporate contents of higher-functional polyisocyanates or modified polyisocyanates or polyisocyanate adducts, having, for example, carbodiimide groups, allophanate groups, isocyanurate groups, urethane groups and/or biuret groups, that are known per se in polyurethane chemistry.

Examples of structural components v) include aliphatic and/or alicyclic primary and/or secondary polyamines. Preferred examples include 1,2-ethane diamine, 1,6-hexamethylene diamine, 1-amino-3,3,5-trimethyl-5-aminomethyl cyclohexane (isophorone diamine), piperazine, 1,4-diaminocyclohexane, bis(4-aminocyclohexyl)methane, adipic acid dihydrazide or diethylene triamine as well as hydrazine or hydrazine hydrate.

Other suitable polyamines include polyether polyamines, which can be obtained by replacing the hydroxyl groups in the polyether polyols described above by amino groups. Such polyether polyamines can be produced by reacting the corresponding polyether polyols with ammonia and/or primary amines.

More preferred structural components v) include 1-amino-3,3,5-trimethyl-5-aminomethyl cyclohexane (isophorone diamine), 1,2-ethane diamine, piperazine and diethylene triamine.

The polyurethane resin dispersions according to the invention have a content of 3 to 30, preferably 7 to 17 mmol of alkali metal salts of sulfonic acids/100 g polyurethane resin solids. Such ionic groups can be incorporated by known means by the addition of structural components vi), such as diamines or polyamines containing alkali sulfonate groups, during synthesis of the polyurethane resins. Examples of suitable compounds vi) are the alkali salts of N-(2-aminoethyl)-2-aminoethane sulfonic acid. The sodium salt is preferred. The free sulfonic acids can also be incorporated during the isocyanate polyaddition process. These must then be neutralized before conversion of the polyurethane resins in water, e.g., by addition of alkali hydroxides, hydrogen carbonates or carbonates.

The present invention also relates to a process for the production of a polyurethane resin dispersion by
　a) reacting in a first step the components i) to iv) to form a prepolymer, then
　b) dissolving in a second step the prepolymer in an organic solvent and
　c) reacting in a third step the isocyanate-containing prepolymer solution with components v) and vi),
　d) precipitating, in a fourth step, the dispersion by addition of water, and
　e) removing in a fifth step the organic solvent.

Free sulfonic acid groups incorporated are neutralized between the third and fourth step.

The polyurethane resin dispersions according to the invention can be produced by known methods of the prior art, such as are described, e.g., by D. Dieterich in Houben-Weyl: Methoden der Organischen Chemie, Volume E20, p. 1670-81 (1987). The polyurethane dispersions according to the invention are preferably produced in the so-called acetone process.

In the acetone process the synthesis of the aqueous preparations of polyurethane resins on which the dispersions according to the invention are based is performed in a multistage process.

In a first stage a prepolymer containing isocyanate groups is synthesized from structural components i) to iv). The dosages of individual components are calculated in such a way that an isocyanate index of 1.1 to 3.5, preferably 1.3 to 2, is obtained. The isocyanate content of the prepolymers is between 1.5 and 7.5%, preferably between 2 and 4.5%, and particularly preferably between 2.5 and 3.5%. When calculating the amounts of structural components i) to iv) it should also be ensured that the calculated number-average functionality is between 1.80 and 3.50, preferably between 1.95 and 2.25.

30 to 76.5 parts by weight of component i), 1 to 30 parts by weight, preferably 3 to 15 parts by weight of component ii), 1 to 10 parts by weight, preferably 1.5 to 6 parts by weight of component iii), 20 to 50 parts by weight of component iv), 0.5 to 13 parts by weight, preferably 1 to 5 parts by weight of component v) and 1 to 8 parts by weight, preferably 1.5 to 5.5 parts by weight of component vi) can be used, with the proviso that the sum of the components is 100.

In a second stage the prepolymer produced in stage 1 is dissolved in an organic, at least partially water-miscible solvent containing no isocyanate-reactive groups. The preferred solvent is acetone. Other solvents, such as, for example, 2-butanone, tetrahydrofuran or dioxan or mixtures of these solvents can also be used, however. The quantities of solvent to be used must be calculated in such a way that a solids content of 20 to 80 wt. %, preferably 30 to 50 wt. %, particularly preferably 35 to 45 wt. %, is obtained.

In a third stage the isocyanate-containing prepolymer solution is reacted with mixtures of the amino-functional structural components v) to vi) with chain extension to form the high-molecular polyurethane resin. The quantities of structural components are calculated in such a way that per mole of isocyanate groups in the dissolved prepolymer, 0.3 to 0.93 mole, preferably 0.5 to 0.85 mole of primary and/or secondary amino groups of structural components v) to vi) result. The calculated number-average isocyanate functionality of the resulting polyurethane resin according to the invention is between 1.55 and 3.10, preferably between 1.90 and 2.35. The calculated number-average molecular weight (Mn) is between 4500 and 250,000, preferably between 10,000 and 40,000 daltons.

In a fourth stage the high-molecular polyurethane resin is precipitated in the form of a fine-particle dispersion by addition of water to the solution.

In a fifth stage the organic solvent is partially or wholly removed by distillation, optionally under reduced pressure. The amount of water in stage four is calculated in such a way that the aqueous polyurethane resin dispersions according to the invention display a solids content of 30 to 65, preferably 35 to 55 wt. %.

The coating compositions containing the polyurethane resin dispersions according to the invention are suitable for the priming of substrates.

Suitable substrates are plastic substrates, e.g., styrene copolymers such as ASA (acrylonitrile-styrene-acrylic ester) or ASA blends, ABS (acrylonitrile-butadiene-styrene), ABS blends, such as ABS polycarbonate, polycarbonate (PC) and PC/PBTP (polybutylene terephthalate), PA (polyamide)/ABS and polyurethanes produced by the RIM (=reaction injection molding) or RRiM (=reinforced RIM) process.

The invention also relates to a paint structure containing a substrate, a primer and optionally one or more paint films, wherein the primer contains the polyurethane resin dispersions according to the invention. The invention also relates to a substrate containing a primer which is prepared from the polyurethane resin dispersion.

EXAMPLES

Example 1 (According to the Invention)
Aqueous Polyurethane Resin Preparation 1600 g of an adipic acid-hexanediol-neopentyl glycol mixed ester having a hydroxyl value of 56, 110 g of a bisphenol A-initiated polypropylene oxide diol having a hydroxyl value of 210 and 107.5 g of a monofunctional, ethylene oxide-rich polyether (78 wt. % ethylene oxide) having a hydroxyl value of 26 were dewatered for 1 hour at 120° C. and 15 mbar. 88.5 g hexane-1,6-diol and 67.5 g butane-1,4-diol were first added at 80° C. As soon as the mixture was homogeneously mixed, 777 g 1-isocyanato-3,3,5-trimethyl-5-isocyanatomethyl cyclohexane (isophorone diisocyanate) were added. The mixture was stirred at 80 to 90° C. until a constant isocyanate content of 2.98 to 2.60% was reached. The reaction product was diluted with 4125 g acetone and cooled to 40° C.

A solution of 63 g 1-amino-3,3,5-trimethyl-5-aminomethyl cyclohexane (isophorone diamine) and 78 g N-(2-aminoethyl)-2-aminoethane sulfonic acid sodium salt in 600 g deionized water were added within 5 minutes. 5 minutes after completion of the addition of the amine solution, 3750 g deionized water were added with vigorous stirring. The acetone was removed by distillation under reduced pressure at a bottoms temperature of 40 to 50° C.

The resulting solvent-free, aqueous polyurethane resin preparation had a solids content of 40±1 wt. % and an average particle size in the disperse phase, determined by laser correlation, of 80 to 130 nm.

Ion content: 14 mmol $SO_3^-$/100 g

EOx (=ethylene oxide content) content: 3.2 wt. %

Example 2 (According to the Invention)
Aqueous Polyurethane Resin Preparation 1600 g of an adipic acid-hexanediol-neopentyl glycol mixed ester having a hydroxyl value of 56, 110 g of a bisphenol A-initiated polypropylene oxide diol having a hydroxyl value of 210 and 107.5 g of a monofunctional, ethylene oxide-rich polyether (78 wt. % ethylene oxide) having a hydroxyl value of 26 were dewatered for 1 hour at 120° C. and 15 mbar. 88.5 g hexane-1,6-diol and 67.5 g butane-1,4-diol were first added at 80° C. As soon as the mixture was homogeneously mixed, 917 g 4,4'-diisocyanatodicyclohexyl methane were added. The mixture was stirred at 80 to 90° C. until a constant isocyanate content of 2.80 to 2.50% was reached. The reaction product was diluted with 4350 g acetone and cooled to 40° C.

A solution of 22 g ethylene diamine and 78 g N-(2-aminoethyl)-2-aminoethane sulfonic acid sodium salt in 450 g deionized water was added within 5 minutes. 5 minutes after completion of the addition of the amine solution, 4000 g deionized water were added with vigorous stirring. The acetone was removed by distillation under reduced pressure at a bottoms temperature of 40 to 50° C.

The resulting solvent-free, aqueous polyurethane resin preparation had a solids content of 40±1 wt. % and an average particle size in the disperse phase, determined by laser correlation, of 90 to 135 nm.

Ion content: 14 mmol $SO_3^-$/100 g

Eox content: 3.3 wt. %

Example 3 (According to the Invention
Aqueous Polyurethane Resin Preparation 550 g of a bisphenol A-initiated polypropylene oxide diol having a hydroxyl value of 210 and 45 g of a monofunctional, ethylene oxide-rich polyether (78 wt. % ethylene oxide) having a hydroxyl value of 26 were dewatered for 1 hour at 120° C. and 15 mbar. 88.5 g hexane-1,6-diol and 67.5 g butane-1,4-diol were first added at 80° C. As soon as the mixture was homogeneously mixed, 799 g 4,4'-diisocyanatodicyclohexyl methane were added. The mixture was stirred at 80 to 90° C. until a constant isocyanate content of 2.90 to 2.75% was reached. The reaction product was diluted with 2350 g acetone and cooled to 40° C.

A solution of 34.8 g 1-amino-3,3,5-trimethyl-5-aminomethyl cyclohexane (isophorone diamine) and 43 g N-(2-aminoethyl)-2-aminoethane sulfonic acid sodium salt in 400 g deionized water was added within 5 minutes and 5 minutes after completion of the addition of the amine solution, 2050 g deionized water were added with vigorous stirring. The acetone was removed by distillation under reduced pressure at a bottoms temperature of 40 to 50° C.

The resulting solvent-free, aqueous polyurethane resin preparation had a solids content of 40±1 wt. % and an average particle size in the disperse phase, determined by laser correlation, of 75 nm.

Ion content: 14 mmol $SO_3^-$/100 g

EOx content: 2.3 wt. %

Comparative Example 4

The dispersion was performed in the same way as Example 1 from DE-A 2 651 506:

1632 parts of a polyester diol comprising hexane-1,6-diol, 2,2-dimethyl propane-1,3-diol and adipic acid having a hydroxyl value of 63 were dewatered at 100° C. under a vacuum of approx. 14 torr and, following the addition of 85 parts of a polyether monoalcohol consisting of N-butanol, ethylene oxide and propylene oxide (in the molar ratio 83:17) having a hydroxyl value of 30, a mixture of 244.2 parts 1-isocyanato-3,3,5-trimethyl-5-isocyanatomethyl cyclohexane (isophorone diisocyanate) and 185 parts hexane diisocyanate-1,6 was added. The mixture was stirred at 100° C. until it displays a content of 4.6 wt. % NCO. After cooling to 50–60° C. 3200 parts anhydrous acetone were added. A mixture of 107 parts 1-amino-3,3,5-trimethyl-5-aminomethyl cyclohexane, 13.3 parts N-(2-aminoethyl)-2-aminoethane sulfonic acid sodium and 10 parts hydrazine monohydrate, dissolved in 260 parts water, was slowly stirred into this acetone solution. After stirring for a further 10 minutes, 3380 parts of water were slowly stirred in with brisk stirring. A bluish-white dispersion of the solid in a mixture of water and acetone was formed. After removal of the acetone by distillation, an aqueous dispersion with a solids content of 40±1 wt. % remains. Measurement of the particle diameter by laser correlation gives a value of approx. 230 nm.

The solids in the dispersion contain 3.1% polyethylene oxide segments and 3 mmol equivalent of sulfonate groups (—$SO_3^-$) per 100 g solids.

Applicational Part

Example 5 and 6

The quantities refer to parts by weight.

| Example | 5 (comparative) | 6 (according to the invention) |
|---|---|---|
| Example 1 | — | 187.2 |
| Example 4 | 187.2 | — |
| Defoamer DNE[1] | 0.6 | 0.6 |
| Tronox RKB4[2] | 30.9 | 30.9 |
| Talc AT 1[3] | 61.8 | 61.8 |
| Bayferrox 318 M[1] | 0.9 | 0.9 |
| Demineralized water | 32.2 | 32.2 |

[1] Bayer AG, Leverkusen
[2] K. Obermayer, Bad Berleburg
[3] Norwegian Talk A/S

Adhesion to Plastic Substrate

The primers according to examples 5 and 6 were sprayed onto plastic sheets measuring 148×102×3 mm (3–5 bar, nozzle size 1.4, dry film thickness approx. 30 μm). The samples were dried for 10 minutes at room temperature and 30 minutes at 80° C. The adhesion was assessed by means of a cross-hatch adhesion test. It was visually graded from 0 to 5, whereby 0 denotes no detachment and 5 complete detachment (DIN 53 151 with adhesive tape detachment).

Adhesion According to Cross-hatch Adhesion Test

| Plastic | Example 5 | Example 6 |
|---|---|---|
| Novodur P2H | 1 | 1 |
| Pocan KV 1-7916/2 | 1 | 0 |
| Pocan S1506 | 5 | 3 |
| Pocan LP PO 609-002 | 2 | 0 |
| Bayblend T 65 MN | 1 | 0 |
| Makrofol | 1 | 0 |

Gloss

The gloss was measured according to DIN 67 530 using a Micro-Tri-gloss instrument supplied by B. Gardner.

The measurement was performed at angles of reflection of 60° and 85° (60°/85°).

| Plastic substrate | Example 5 | Example 6 |
|---|---|---|
| Novodur P2H | 5.5/12.9 | 31.8/49.2 |
| Pocan KV 1-291612 | 5.5/14.1 | 30.2/45.9 |
| Pocan S1506 | 5.8/15.6 | 25.3/39.1 |
| Pocan LPPO609-002 | 5.3/12.9 | 26.2/43.6 |
| Bayblend TGSMM | 5.3/12.7 | 24.2/38.7 |
| Makrofol | 5.5/14.6 | 22.5/38.9 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An aqueous polyurethane resin dispersion comprising
   i) a polyol component with a number-average molecular weight of at least 300 daltons, comprising at least one polyether diol initiated on an aromatic diol,
   ii) a polyol component with a number-average molecular weight of 62 to 299 daltons,
   iii) a monofunctional isocyanate-reactive compound with an ethylene oxide content of at least 50 wt. % and a molecular weight of at least 400 daltons,
   iv) a polyisocyanate,
   v) an aliphatic polyamine with a molecular weight of 60 to 300 daltons or hydrazine, and
   vi) a hydrophilic aliphatic diamine.

2. The polyurethane resin dispersion of claim 1 wherein the aromatic diol is hydroquinone, resorcinol, catechol, 2,2-bis(4-hydroxyphenyl)propane (bisphenol A), ortho-, iso- or terephthalic acid.

3. The polyurethane resin dispersion of claim 1 wherein the aromatic diol is 2,2-bis(4-hydroxyphenyl)propane.

4. The polyurethane resin dispersion of claim 1 wherein the polyether polyol initiated on an aromatic diol comprises a propoxylation product of 2,2-bis(4-hydroxyphenyl)propane in the molecular weight range between 300 and 3000 daltons.

5. The polyurethane resin dispersion of claim 1 wherein component i) comprises between 3 and 100 parts by weight of the polyether diol initiated on an aromatic diol.

6. The polyurethane resin dispersion of claim 1 comprising a content of 3 to 30 mmol alkali metal salts of sulfonic acid/100 g polyurethane resin solid.

7. A process for the production of a polyurethane resin dispersion of claim 1, comprising
   a) reacting in a first step the components i) to iv) to form a prepolymer, then
   b) dissolving in a second step the prepolymer in an organic solvent and
   c) reacting in a third step the isocyanate-containing prepolymer solution with components v) and vi),
   d) precipitating, in a fourth step, the dispersion by addition of water, and
   e) removing in a fifth step the organic solvent.

8. The process of claim 7 comprising reacting 30 to 76.5 parts by weight of component i), 1 to 30 parts by weight of component ii), 1 to 10 parts by weight of component iii), 20 to 50 parts by weight of component iv), 0.5 to 13 parts by weight of component v) and 1 to 8 parts by weight of component vi), with the proviso that the sum of the components is 100 parts by weight.

9. A coating composition comprising
   A) 30 to 90 parts by weight of the polyurethane resin dispersion of claim 1,
   B) 5 to 60 parts by weight of an inorganic filler,
   C) 1 to 60 parts by weight of a water-miscible polyisocyanate,
   D) 0.1 to 30 parts by weight of a pigment and
   E) 1 to 15 parts by weight of conventional paint auxiliary substances,
whereby the sum of the components is 100 parts by weight.

10. A substrate coated with a primer which is prepared from the polyurethane resin dispersion of claim 1.

11. The substrate of claim 10 wherein the substrate is a plastic substrate.

12. The substrate of claim 10 further comprising one or more paint films.

* * * * *